United States Patent [19]

Yokota

[11] Patent Number: 4,726,920

[45] Date of Patent: Feb. 23, 1988

[54] METHOD OF CONTROLLING OPENING/CLOSING OF MOLD IN INJECTION MOLDING MACHINE

[75] Inventor: Akira Yokota, Hiroshima, Japan

[73] Assignee: The Japan Steel Works, Ltd., Tokyo, Japan

[21] Appl. No.: 831,192

[22] Filed: Feb. 20, 1986

[30] Foreign Application Priority Data

Feb. 20, 1985 [JP] Japan .................. 60-30630

[51] Int. Cl.⁴ .................. B29C 45/67; B29C 45/80
[52] U.S. Cl. .................. 264/40.5; 264/40.1; 264/328.1; 425/149; 425/150
[58] Field of Search .................. 264/40.1, 40.5, 40.7, 264/328.1; 425/145, 149, 150

[56] References Cited

U.S. PATENT DOCUMENTS

| | | | |
|---|---|---|---|
| 4,131,596 | 12/1978 | Allen | 264/40.5 |
| 4,158,539 | 6/1979 | Arends et al. | 425/394 |
| 4,301,100 | 11/1981 | Farrell | 264/40.5 |
| 4,345,890 | 8/1982 | Hemmi et al. | 264/40.5 |
| 4,377,377 | 3/1983 | Arends et al. | 425/451.2 |
| 4,473,345 | 9/1984 | McDowall | 264/40.5 |

FOREIGN PATENT DOCUMENTS 2928940 2/1981 Fed. Rep. of Germany ..... 264/40.1

Primary Examiner—Jan H. Silbaugh
Assistant Examiner—James Bartholomew
Attorney, Agent, or Firm—Sughrue, Mion, Zinn, Macpeak & Seas

[57] ABSTRACT

A method for controlling the opening/closing of a mold in an injection molding machine providing an increased accuracy. A changeover position indicative of a speed of a movable plate or the changeover position of a pressure is preset in accordance with a corresponding position of the movable plate. The value thus set is arithmetically converted to a corresponding displacement distance of a rod of a mold-clamping cylinder. The converted value is compared with the detected displacement of the rod, and when the two values coincide, the hydraulic pressure controlling the mold is changed appropriately.

3 Claims, 2 Drawing Figures

METHOD OF CONTROLLING OPENING/CLOSING OF MOLD IN INJECTION MOLDING MACHINE

BACKGROUND OF THE INVENTION

The present invention relates to a method for effecting a mold opening/closing step in an injection molding machine having a toggle-type mold-clamping mechanism.

Conventionally, for controlling the speed of a movable plate or of the pressure applied to a movable plate when a mold of an injection molding machine is opened/closed, a method has been employed in which the movable plate speed or the applied pressure is changed depending on the displacement position of the movable plate. A limit switch, potentiometer, or linear encoder has been used to detect the plate displacement position. Especially when the mold opening/closing operation is centrally and remotely controlled, there has been employed a controlling method wherein a displacement position detecting device such as a potentiometer or a linear encoder is used to directly detect the displacement position of the movable plate, and a signal is thereby generated to change the moving plate speed or applied pressure when the detected value agrees with a preset value.

This method is frequently employed not only in direct-pressing type mold-clamping systems, but also in toggle-type mold-clamping systems. Although enhancement of the mold-clamping force just before a mold-clamping operation is achieved in the latter toggle-type mold-clamping operation is achieved in the latter togle-type mold-clamping system, in order to increase the accuracy in detecting foreign matter sandwiched between metal molds, it is possible to provide much higher accuracy in the case where control is carried out by detecting the displacement distance of a movable rod of the mold-clamping cylinder than by detecting the displacement position of the movable plate. That is, since the displacement distance S (stroke) of the cylinder rod is much greater than the displacement distance S' (stroke) of the movable plate, the accuracy is correspondingly higher if control is performed in accordance with the displacement distance of the rod. The ratio between the displacement distances (S/S') is typically larger than about ten, and may be larger than about 20 just before touching the metal mold. The applicant has filed a Japanese patent application (No. 53-31052) concerning such a metal mold protecting device.

In the toggle-type system, there is a correlation between the displacement distance S of the rod and the displacement distance S' of the movable plate. However, as indicated by the graph of FIG. 2, the relationship between the displacement distances S and S' is nonlinear, and therefore the above-mentioned method in which the displacement distance of the movable plate is directly detected to control the speed or the pressure in the mold opening/closing operation has generally been preferred, similar to the direct pressing type mold-clamping system. In a mold opening/closing control method which employs the advantages of a toggle-type mold-clamping system, there has been additionally provided a detecting device such as a limit switch, a contactless switch, or the like, for detecting the displacement distance S of the rod of the mold-clamping cylinder in order to increase the accuracy in detecting foreign matter. However, such a detecting device must be provided not as a central and remotely controlled unit, but as a unit inside a mold-clamping device section of the injection molding machine.

Therefore, because in the conventional injection molding machine having a toggle-type mold-clamping mechanism the displacement distance of the movable plate is directly detected and controlled in order to control the plate speed of or pressure applied to the movable plate in mold opening/closing operations, and further beacuase it is necessary to provide another device for detecting the displacement distance of the rod of the mold-clamping cylinder inside the machine, the overall structure of the apparatus is complicated. Furthermore, in the toggle-type injection molding machine, it has been proposed to provide cam means and limit switches for detecting an operational movement of a cross link to control the mold opening/closing operation. However, according to this proposal, since the mold movement and the cross link movement are not kept in a linear relationship, it is difficult to effect the adjustment and setting of the works.

SUMMARY OF THE INVENTION

In order to solve the problems of the prior art described above, according to the present invention, by utilizing the fact that there is a correlation between the displacement distance S of the rod of the mold-clamping cylinder and the displacement distance S' of the movable plate, a setting value is determined in advance in accordance with the position of the movable plate, and the position of the movable plate is converted on the basis of the setting value into the displacement distance of the rod of the mold-clamping cylinder to thereby control the movable plate speed or applied pressure in a mold opening/closing operation in an injection molding machine on the basis of the thus-obtained position. Specifically, when the value of the detected displacement distance of the rod of the mold-clamping cylinder agrees with the value in a converted changeover position storage device, an electromagnetic flow adjustment valve or an electromagnetic relief valve in a hydraulic pressure circuit is controlled by a sequencer.

That is, the displacement distance S' of the movable plate is converted into the displacement distance S of the rod of the mold-clamping cylinder and control is performed by comparing the result of the conversion with the detected value of the actual displacement distance of the rod.

DESCRIPTION OF THE PREFERRED EMBODIMENTS

Figure 1:
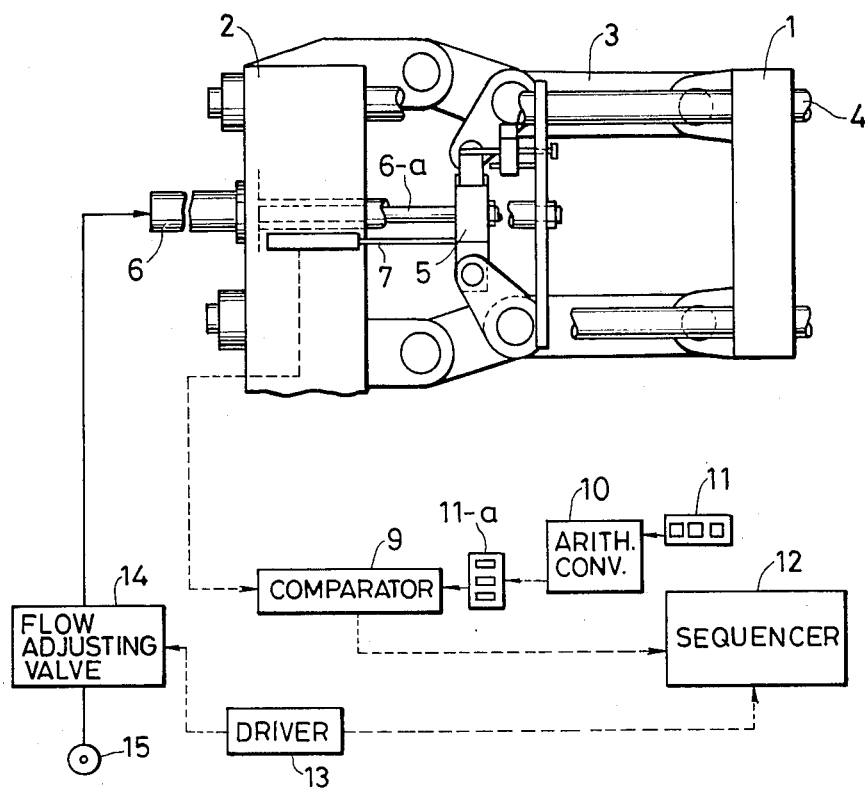
FIG. 1 is a block diagram showing a preferred embodiment of a control system according to the present invention.
Figure 2:
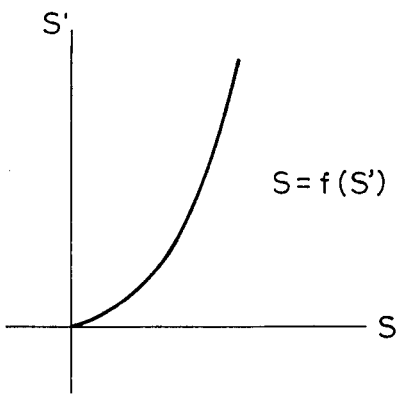
FIG. 2 is a graph showing the relationship between the displacement distance of a rod of a mold-clamping cylinder and a displacement distance of a movable plate.

FIG. 1 is a block diagram illustrating a preferred embodiment of a control system constructed according to the present invention.

A rod displacement distance detecting device 7 for detecting the displacement distance S of a rod 6a of a mold-clamping cylinder 6 is provided between a mold-clamping housing 2 and a cross link 5 connected to the rod 6a. Reference numeral 1 designates a movable plate, 3 a toggle link, and 4 a tie bar for guiding the movable plate 1.

The control system will be described. Reference numeral 11 designates a changeover position setting device for controlling the speed of plate 1 or pressure applied to the movable plate 1 in a mold opening/closing operation, the changeover position being determined depending on the displacement position of the movable plate. An arithmetic conversion arithmetic device 10 converts the setting value of the changeover position setting device 11 into a displacement distance S of the rod 6a according to a mathematical expression corresponding to the relationship between the displacement distance S of the rod 6a and the displacement distance S' of the movable plate 1 (which have been stored in advance), and supplies the converted value to a converted changeover position storage device 11a. A comparator 9 is supplied with the detected value from the device 7 for detecting the displacement distance of the rod 6a and a converted value of the setting value from the converted changeover position storage device 11a. When the values of the two agree, the comparator 9 provides a changeover signal to a sequencer 12. In response to this signal, the sequencer 12 actuates an electromagnetic flow adjusting valve or an electromagnetic relief valve 14 in a hydraulic circuit to operate, through a driver amplifier 13, a valve to control the above-mentioned plate speed or pressure of the hydraulic fluid applied to the hydraulic cylinder.

Since the present invention employs an arrangement as described above, it is not necessary to detect directly the displacement position of the movable plate, and the displacement position of the movable plate can be detected as an amplified value of the displacement position of the movable rod of mold-clamping cylinder. Hence, the accuracy of changeover control is increased, and it is possible to make the setting of the changeover position on the basis of the displacement position of the movable plate. Further, the accuracy in detecting foreign matter in the mold is improved by using the toggle magnifying ratio, which is a feature of a toggle-type mold clamping mechanism, and all of the control operations described above may be performed centrally and remotely.

I claim:

1. A method for controlling opening/closing of a mold of an injection molding machine having a toggle-type mold-clamping mechanism operated by a mold-clamping cylinder acting under hydraulic pressure and having a displaceable rod coupled to said toggle-type mold-clamping mechanism for moving a movable plate under applied hydraulic pressure to said mold clamping cylinder, said method comprising the steps of: providing to a changeover position setting device a value corresponding to a position of said movable plate indicative of achievement of mold-clamping; arithmetically converting the value set in said setting device into a converted value equal to the displacement distance of said rod of a said mold-clamping cylinder corresponding to said changeover position value set in said setting device; storing the converted value; detecting the actual displacement distance of said rod of said mold-clamping cylinder; comparing the stored converted value with the detected displacement distance of said rod; and changing by said setting device said hydraulic pressure applied to said hydraulic cylinder upon coincidence between the detected displacement distance of said rod and the stored value to thereby set a speed of said movable plate or a pressure applied to said movable plate which is appropriate to said achievement of mold-clamping.

2. The method for controlling opening/closing of a mold of claim 1, wherein said step of changing said hydraulic pressure is effected by a sequencer driving a flow adjusting valve.

3. The method for controlling opening/closing of a mold of claim 1, wherein said step of adjusting said hydraulic pressure is effected by a sequencer driving an electromagnetic relief valve.

* * * * *